E. H. BRISTOL.
MEASURING INSTRUMENT.
APPLICATION FILED JAN. 10, 1913.
1,272,344.
Patented July 9, 1918.
3 SHEETS—SHEET 1.
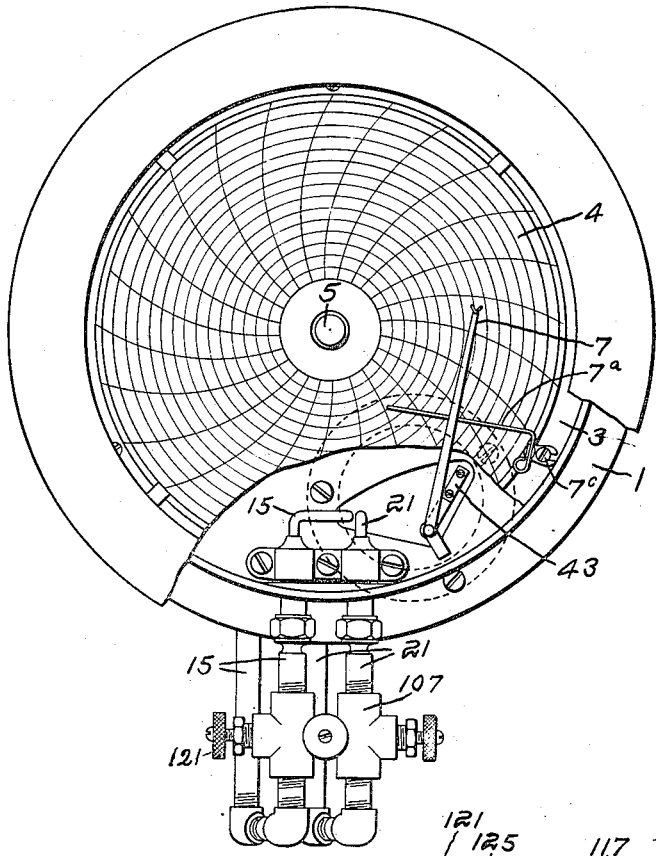
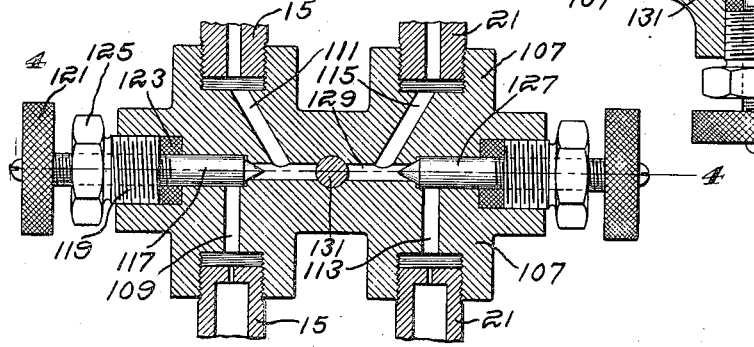
Witnesses:
Carl L. Choate.
Horace A. Grossman
Inventor:
Edgar H. Bristol,
by Emery, Booth, Janney & Varney,
Attys.

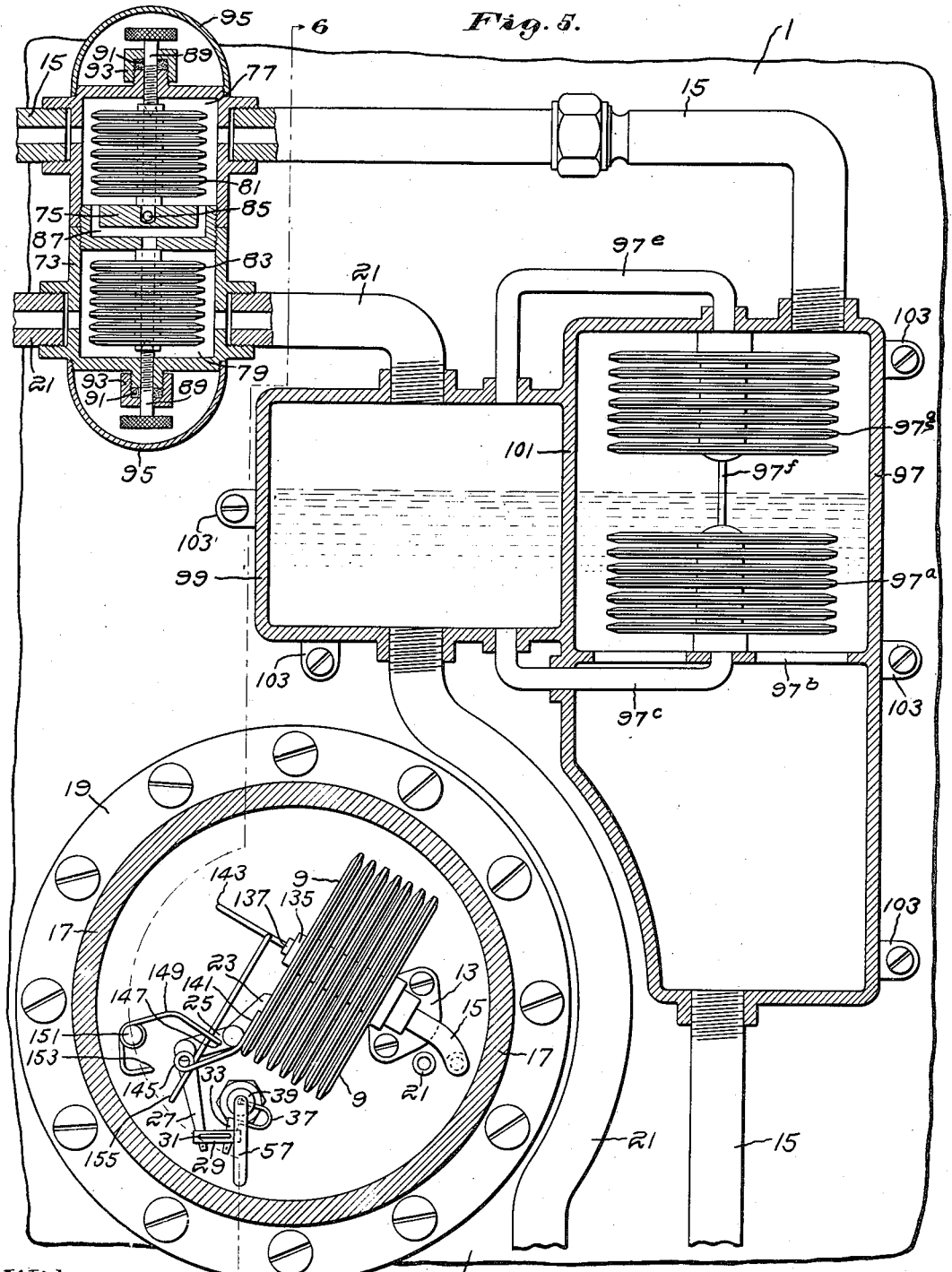

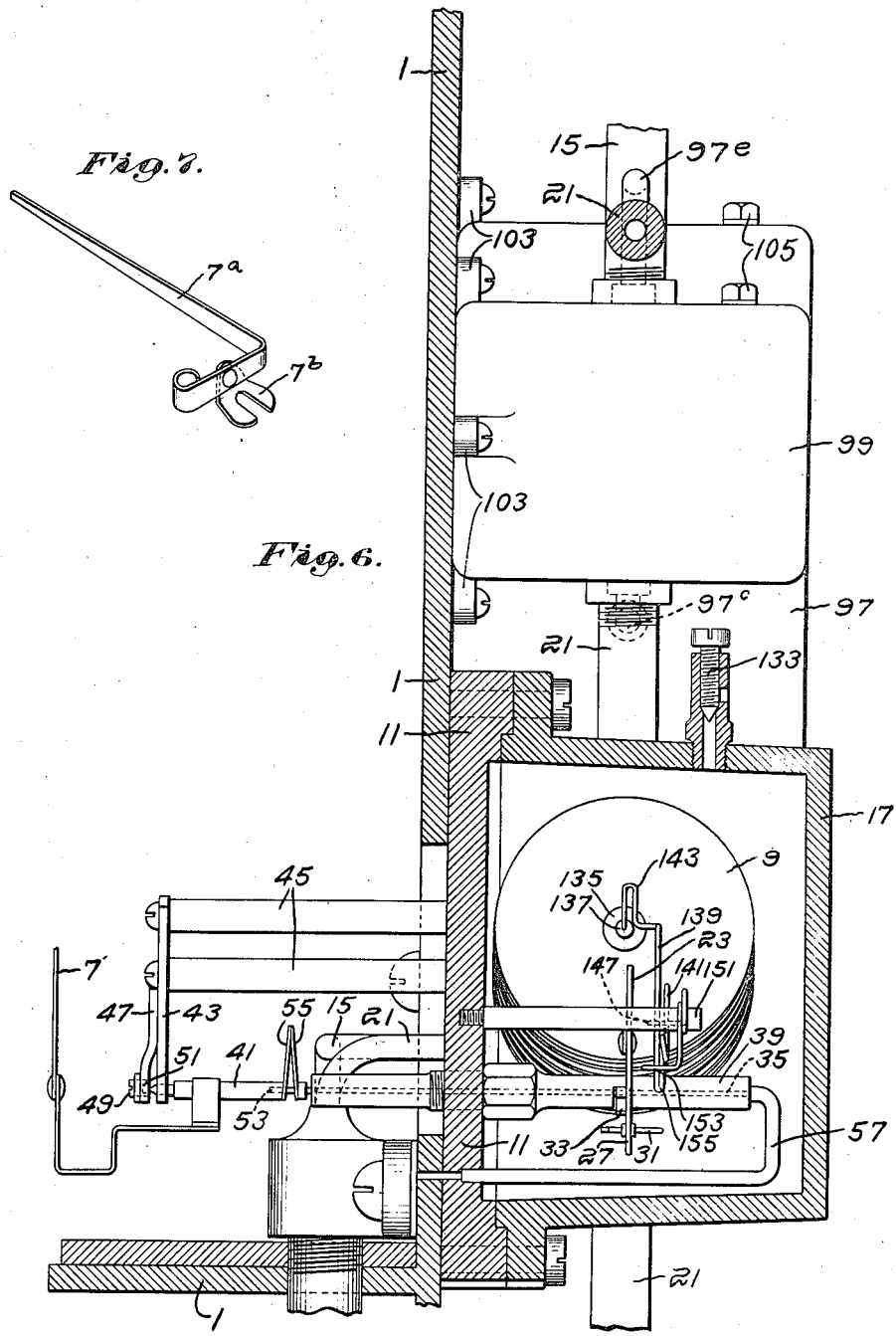

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

MEASURING INSTRUMENT.

1,272,344.   Specification of Letters Patent.   Patented July 9, 1918.

Application filed January 10, 1913. Serial No. 741,198.

*To all whom it may concern:*

Be it known that I, EDGAR H. BRISTOL, a citizen of the United States, and a resident of Foxboro, in the county of Norfolk and Commonwealth of Massachusetts, have invented an Improvement in Measuring Instruments, of which the following description, in connection with the accompanying drawings, is a specification, like characters on the drawings representing like parts.

This invention relates to instruments for indicating or recording changes in temperature pressure and the like.

As shown herein, the invention is embodied in a pressure responsive instrument for indicating and recording differential pressures.

The character of the invention may be best understood by reference to the following description of an illustrative embodiment thereof shown in the accompanying drawings, wherein:

Figure 1 is a front elevation of an illustrative gage embodying the invention with a portion of the face of the gage broken away to disclose mechanism back of said face;

Fig. 2 is a side elevation of Fig. 1;

Fig. 3 on an enlarged scale is a sectional detail of parts shown in Fig. 1;

Fig. 4 is a section taken on line 4—4 of Fig. 3;

Fig. 5 on an enlarged scale is a view partly in vertical section and partly in elevation of the apparatus mounted at the rear of the casing shown in Figs. 1 and 2;

Fig. 6 is a section taken on line 6—6 of Fig. 5; and

Fig. 7 is a perspective view of a detail to be referred to.

Referring to the drawing, the illustrative instrument there shown as embodying the invention comprises a casing 1 (Fig. 1) in which is fixed a circular plate 3 adapted to receive and support a chart 4 graduated radially to represent periods of time and circularly to represent any desired units or scale of values, said chart being detachably secured to and rotated by a shaft 5 driven by a suitable clock mechanism (not shown) contained in the said casing. An index or pointer shown herein as a pen index 7 is movable over said chart and may be caused to travel in a generally radial direction over said chart to indicate or record thereon a pressure prevailing at or during any instant or period of time.

To prevent the inadvertent marking of the chart by the index pen while inserting or removing charts, there may be provided a device adjustable to support the index pen temporarily out of contact with the chart. As shown herein, this device comprises an L shaped arm 7$^a$ (Figs. 1 and 7) fulcrumed on a bracket 7$^b$ which may be bifurcated for insertion beneath the head of a usual screw 7$^c$ for securing the chart supporting plate within the casing. When it is desired to insert or remove the chart the arm 7$^a$ is rocked on its bracket sufficiently to engage and lift the index pen out from contact with the chart. The pivotal connection of the arm with its bracket is sufficiently tight to cause the arm to remain in this position. After the chart has been inserted the arm is rocked downward again so that it lies between the index and the chart, but without engaging or in any way interfering with the operation of the index.

To control the movement of the index there is provided a pressure responsive expansion tube 9 (Figs. 5 and 6) composed of a series of expansible sections or diaphragms adapted to be elongated or contracted by variation of pressure. An expansion tube of the general character shown herein is disclosed in Letters Patent No. 420,570, granted to W. H. Bristol February 4, 1890. One end of the pressure responsive tube is fixedly secured to a plate 11 (Fig. 2) on the rear of the casing 1 by a bracket 13 (Fig. 5). Pressure is admitted to the interior of the tube through a pipe 15 connected to said bracket.

The tube 9 is mounted and inclosed within a chamber formed by a casing 17 having a flange 19 detachably secured to said plate 11 by suitable screws. Pressure may be admitted to the interior of this chamber through a pipe 21. By the above described construction fluids of different pressures may be admitted to the interior of said tube and chamber respectively and the tube will expand or contract according to the preponderance of the pressure within or without the same.

To transmit movements of the expansion tube to the index 7 referred to, an arm 23 (Fig. 5) may be secured to the expansion tube and be adjustably connected by arms 25 and 27 with a link 29. The arms 23, 25 and 27 may be connected by rivets which will permit said arms to be adjusted and set to provide the desired movement of the index and then said rivets may be soldered to said arms to permanently connect the latter. A yoke 31 secures the link 29 to the arm 27 and to an arm 33, the latter being secured to a shaft 35 (Fig. 6) which is connected to the index 7, as more fully hereinafter described. One leg of the yoke is entered through registering holes in said arm 27 and link and the other leg of the yoke is entered through registering holes in said link and said arm 33. To vary the effective length of the arm 33 it may be provided with a series of holes, in any of which the yoke may be entered. The arms 25, 27, the link 29 and the yoke 31 may be constructed as shown and claimed in my copending application, Serial No. 704,953 filed June 21, 1912.

By inserting one leg of the yoke into the different holes of the arm 33 a considerable range of adjustment may be obtained, but to provide a greater nicety of adjustment the arm 33 may have a flexible yoke or U shaped portion 37 whereby the arm may be pulled from or pushed toward the shaft 35 more or less and its effective length varied as desired. This flexible portion, however, has sufficient inherent stiffness to hold the arm in the position to which it is adjusted.

The shaft 35 is journaled within a bearing tube 39 (Fig. 6) laterally recessed to receive and permit the connection of the arm 37 to said shaft. The bearing tube 39 is threaded to the chamber base plate 11 referred to and projects through and beyond the same a substantial distance within the interior of the casing 1.

To transmit the rotative movement of the shaft 35 to the index 7 a shaft 41 is provided secured to said index and having one end journaled in an arm 43 carried by posts 45 secured to the base plate 11 of the casing 1. The pressure of the pen of the index 7 on the chart will tend to shift the shaft 41 axially to the left (Fig. 6). To oppose this movement there is provided on the arm 43 an arm 47 having an offset end in which is threaded a stud 49 carrying a jewel or other suitable end thrust resisting bearing 51 engaged by the pointed end of the shaft 41.

The pressure of the index on the chart and the weight of the index tend also to rock the shaft 41 out of true alinement with the shaft 35. It is, therefore, desirable to flexibly connect the shafts 35 and 41 so that any departure thereof from true axial alinement may not cause the same to bind in and be retarded by their bearings. The illustrative flexible connection shown herein is formed by extending an end of the shaft 35 slightly beyond the bearing tube 39 and introducing the same into a recess 53 in the end of the short shaft 41. To transmit rotative movement from the shaft 35 to the shaft 41 a pair of resilient arms 55 is provided forming part of the flexible connection, one of said arms being fast to the shaft 35 and the other fast to the shaft 41. As stated, the tendency of the index is to thrust the shaft 41 axially to the left (Fig. 6). The resiliency of the arms 55 is such that they tend to move toward one another and draw the shaft 35 axially so that its end seats in the recess 53 of shaft 41 and thus the shafts are properly coupled together. The point of connection of the index with the shaft 41 is near the coupling point of the two shafts and the coupling point is located but a short distance from the end of the long shaft bearing 39. As a result, there is little liability of bending or straining the long shaft in such a manner as to cause it to bind in its bearing and retard its rotative movement. This is advantageous since any friction on said shaft will tend to prevent the accurate transmission of the movement of the tube to the index.

One end of the bearing of the shaft 35 is in the casing 1, where there is one pressure, and the other end is in the casing 17, where there may be a different pressure. To maintain equal pressures on the ends of said shaft and thereby prevent axial thrust thereof from this difference in pressure the end of the bearing tube 39 within the chamber 17 is closed from said chamber by a pipe 57 (Fig. 6) having one end connected to said bearing tube and the other end open and communicating with the interior of the casing 1.

The expansion tube is a sensitive piece of mechanism and it is important to prevent any possibility of injury thereto by compression or expansion thereof beyond its normal limits. While the difference between the pressures may be comparatively small, yet the pressures within the tube and in the casing individually may be high. If a high pressure should be introduced in one before the other, it might either expand or contract the expansion tube to such an extent as to strain the same beyond its elastic limit and thereby destroy the delicacy and accuracy thereof.

One of the objects of the invention is to provide means which will be effective for automatically equalizing the pressures within the expansion tube and casing in the event that the pressure in either exceeds a predetermined limit. To this end there is interposed in the pipes 15 and 21 (Fig. 5) leading to the expansion tube and casing respectively, a pressure equalizing device comprising a casing 73 (Figs. 2 and 5) divided by a partition 75 into two compartments 77 and 79. The fluid will normally flow through the pipes 15 and 21 and through these respective compartments without the fluid in one compartment passing into the other compartment.

To permit the flow of fluid from either of the compartments to the other on the occurrence of excessive pressures, suitable automatic valve means is provided for each compartment. As shown herein, this valve means includes expansion tubes 81 and 83, which may be similar in their general structure to the expansion tube 9 described.

One end of the expansion tube 81 is fixed to the partition 75. To provide communication from the interior of the expansion tube 81 to the compartment 79 the fixed end of the tube is bored and communicates with a U-shaped channel 85 in said partition 75 and leading to said compartment 79. The channel 85 is similar to the channel 87 shown in Fig. 5.

One end of the expansion tube 83 is also fixed to the partition 75. To provide communication between the interior of the expansion tube 83 and the compartment 77 the fixed head of the expansion tube 83 is apertured and communicates with a U-shaped channel 87 also in said partition 75 and communicating with the chamber 77. The channels 85 and 87 are similar, but in planes at right angles to one another.

The movable ends of the expansion tubes are provided with valve openings for coöperation with valve seats typified herein as the conical ends of screws 89 threaded in bosses in the ends of the casing 73 and rendered tight by gaskets 91 in caps 93. These valve screws 89 may be adjusted to vary the tension and responsiveness of the expansion tubes 81 and 83 as desired. To prevent tampering with said valve screws after they are once set they may be inclosed in suitable housings 95.

When fluids are admitted through the chambers 77 and 79 at normal pressures the expansion tubes 81 and 83 will remain seated against the screw valves 89, but if the pressure for example in chamber 77 exceeds a predetermined limit the expansion tube 81 will be compressed and move away from the screw valve 89, thereby admitting the fluid in the compartment 77 into the interior of the expansion tube 81, thence through the channel 85 into the compartment 79. Similarly in case the pressure in the compartment 79 exceeds a predetermined limit the expansion tube 83 will be compressed so as to move away from its screw valve 89, thereby permitting the fluid in the compartment 79 to pass into the interior of the expansion tube 83, and thence through the channel 87 into the compartment 77.

Thus by this valve construction there is provided means for automatically equalizing the pressures in the compartments in case the pressure in either of them becomes excessive and at the same time the equalizing effect will be transmitted through the pipes 15 and 21 to and into the index governing expansion tube and its chamber. As a result the pressures in said tube and chamber will be automatically equalized and there will be no possibility of undue distortion of the expansion tube.

By adjusting the valve screws 89 toward or from the expansion tubes 81 and 83 the tension and responsiveness of the latter may be varied so that they may be arranged to automatically open and permit the equalizing of the pressures at any desired pressure. For example, in some cases it is desirable to automatically equalize the pressures before the index has traveled to the extreme high pressure limit of its scale. By this adjustable valve construction the pressure equalizing point may be set so that the pressure will be automatically equalized when the index reaches the extreme high pressure limit of its scale or when said index is at any desired predetermined distance from the high pressure limit of its scale.

In order to prevent corrosion or other injury from the fluids to the pressure responsive mechanism contained in the casing 17 the tube and casing may be filled with oil or other suitable liquid. To this end oil tanks may be interposed in the pipes 15 and 21 for conducting the fluids to the receiver and casing. As shown herein two tanks 97 and 99 are shown conveniently in one integral casing formed into two chambers by a dividing partition 101. This casing may be supported by the pipes 15 and 21 or it may be attached to the rear of the casing 1 by screws entered through ears 103 on said casing. Oil may be supplied to the tanks 97 and 99 through inlets normally closed by threaded plugs 105 (Fig. 6). The oil transmits the pressure of the fluids to the pressure responsive mechanism and at the same time separates the fluids from the mechanism and thereby insulates and protects the mechanism from any corrosive or other deleterious effect from said fluids.

The volume of oil in the expansion tube 9 and the oil tank 97 should be the same as the volume of oil in the tube containing casing 17 and the oil tank 99. If a smaller volume were in one than the other the larger volume under temperature changes might expand to a greater extent than the smaller volume and thereby raise the level in one of the oil tanks above the level in the other oil tank. This would create a difference in head in the two tanks which would create a differential pressure which would affect the expansion and contraction of the index controlling tube 9. It is therefore very important to provide equal volumes of oil within and without the expansion tube 9 in order that there may be no difference in the oil levels in the tanks which would affect the reading.

The space within the tube containing casing 17 surrounding the tube is considerably greater than the space within the tube. The tank 97 communicates with the tube 9 and the tank 99 communicates with the casing 17. The tank 97 communicating with the smaller space is therefore made sufficiently larger than the tank 99 communicating with the larger space in order to compensate for the difference in the volumes in the tube and casing.

The expansion and contraction of the index controlling tube 9 under the action of different fluid pressures will cause the oil levels in the tanks 97 and 99 to vary. For example, if the tube 9 is expanded the oil level in the tank 97 feeding said tube will tend to drop and the oil level in the tank 99 feeding the tube casing will tend to rise. To compensate for this variation in oil levels and maintain the levels constantly equal in order that there may be no modification of the indication from a difference in oil heads there is provided a mechanism which will now be described with more particular reference to Fig. 5.

As shown herein the illustrative mechanism for this purpose comprises an expansion tube $97^a$ substantially similar in construction and size to the index controlling expansion tube 9 described. This expansion tube is located within the oil casing 97 and has one end mounted on a supporting frame $97^b$ extending horizontally across said casing. To provide communication between the tank 99 and the interior of the expansion tube $97^a$ the latter is connected to said tank by a pipe $97^c$. It will be apparent that the tube $97^a$ being submerged beneath the level of the oil in the tank 97, if expanded, will cause the level of the oil to rise in said tank and if, on the other hand the expansion tube $97^a$ is contracted it will cause the oil level in said tank to drop. The expansion tube $97^a$ should expand and contract in conformity with the expansion and contraction of the index controlling tube 9 in order to cause the oil level in the tank 97 to remain the same as the oil level in the tank 99.

Since the oil level in the tank 99 tends to rise while the oil level in the tank 97 tends to fall the expansion of the submerged tube would not be sufficient to equalize the levels in the tanks were it not for the fact that said tube communicates with the tank 99 through the pipe $97^c$ and thereby withdraws oil from the tank 99 as said tube expands.

To control the expansion and contraction of the submerged tube $97^a$ in order that it may be caused to expand and contract as the index controlling expansion tube 9 expands and contracts there is provided a controlling expansion tube $97^g$ of the same general construction and size as the index controlling tube 9 and the submerged tube $97^a$ with this difference: that the controlling tube is of weaker metal, less stiff, and therefore more responsive to pressure than the tube $97^a$. The controlling tube $97^g$ is also located within the casing 97 and one end thereof may be conveniently secured to the top of said casing. The controlling tube $97^g$ communicates with the tank 99 through a pipe $97^e$. The controlling tube is connected to the submerged tube by a link or rod $97^f$ suitably connected to the opposed ends of the controlling and expansion tubes.

The operation of this level controlling device is as follows: If the fluid pressure in the pipe 15 and on the oil level in the tank 97 is greater than the fluid pressure in the pipe 21 and on the oil level in the tank 99 the index controlling tube will expand, and as a result, the oil level in the tank 97 tends to lower and the oil level in the tank 99 tends to rise. The pressure in the tank 97, being greater than that in the tank 99, will cause the controlling tube to collapse more or less. In doing so it will pull up the free head of the submerged tube $97^a$ and cause the latter to expand, thereby causing the tube to have a greater displacement and causing the oil level in the tank 97 to rise. The submerged tube in expanding will draw oil from the tank 99 in proportion to its expansion. It would not be necessary to draw oil from the tank 99 if the oil level therein remained constant while the oil level in the tank 97 is lowering since then the increase in volume of the tube $97^a$ would cause a displacement of the oil sufficient to compensate for the fall in level due to the expansion of the index controlling tube 9 and would maintain the oil level in the tank 97 the same as the oil level in the tank 99. But since the oil level in the tank 99 is rising as the oil level in the tank 97 is lowering it is necessary to withdraw oil from the tank 99 to compensate for the tendency of the oil level to rise in said tank. Thus by the device described the same oil levels are maintained in the tanks when the index controlling tube is expanding.

When the index controlling tube is contracting owing to a greater pressure in the pipe 21 and tank 99 than in the pipe 15 and the tank 97 the level in the tank 97 tends to rise and the level in the tank 99 tends to fall and the controlling tube $97^g$ will expand and cause the submerged tube to contract. This contraction of the submerged tube will cause the level in the tank 97 to fall and said tube will force some of its liquid through the pipe $97^c$ into the tank 99. This will maintain the same levels in the two tanks.

By the device described the levels in the tanks are maintained the same, and hence the hydrostatic heads of the oil in the two tanks are maintained the same and the pressure of the oil within the index controlling tube balances the pressure of the oil on the outside of said tube.

The oil supply tanks, it will be observed, are located between the equalizing expansion tube valve mechanism and the index governing tube 9 and its casing. As a result, the equalizing expansion tube valve mechanism is in a position to automatically equalize the pressures on the surfaces of the oil in the tanks in the event that either of these pressures exceeds a predetermined limit.

To control manually the admission of pressure to the responsive tube and its casing, suitable valve means may be interposed in the pipes 15 and 21 preferably adjacent the casing 1. As shown herein this valve means (Figs. 1, 3 and 4) comprises a union 107 including ducts 109 and 111 communicating with one of said pipes and ducts 113 and 115 communicating with the other pipe. To control the passage from the duct 109 to the duct 111 there is provided a needle valve 117 threaded into a bushing 119, the latter in turn being threaded in a boss in said union. The needle valve 117 may be controlled by a knurled handle 121 and the bushing 119 may be set tightly against a packing 123 by a nut 125 on said bushing. The threads between the bushing and boss and the threads between the needle valve and bushing have the same pitch so that if the needle valve handle 121 is held stationary the bushing nut may be set up and adjusted against its packing without disturbing the position of the needle valve.

Admission from the duct 113 to the duct 115 is controlled by a needle valve 127 similar to that already described.

To provide communication between the ducts 109, 111 and the ducts 113, 115, a cross duct 129 is provided. To control the passage of fluid through this duct a needle valve 131 is provided similar to those just described. The needle valve 131 is first opened and then the needle valve 127. The opening of the latter valve will admit fluid into the duct 113 through the duct 129 to the ducts 111 and 115 simultaneously. As a result, equal pressures will be admitted within and without the expansion tube. Next the needle valve 117 is opened admitting fluid pressure through the duct 109 to the ducts 111 and 113. The pressures within and without the expansion tube will still remain equal. Then the needle valve 131 is closed, thereby shutting off communication between the ducts 109 and 111, and the ducts 113 and 115. As a result, communication between the pipes 15 and 21 will be closed and the pressures in the expansion tube and casing will be independent of one another.

Thus the valves may be progressively opened in such a manner as to prevent the admission of excess pressure within the expansion tube or casing such as might compress or expand said tube beyond its normal limits.

This arrangement of controlling valve is not only desirable for regulating the initial introduction of pressure to the pressure responsive mechanism, but also for adjusting the oil in the two tanks 97 and 99 to the same level in filling said tanks.

To control the admission of pressures to the pipes leading into the automatic valve equalizing mechanism, a union and needle valve controlling mechanism 132 (Fig. 2) similar to that just described in connection with the union 107 may be provided in the portions of the pipes 15 and 21 leading to said automatic valve equalizing mechanism.

To permit the escape of air from the casing 17 in filling the same with oil, a needle valve 133 (Fig. 6) is set in said casing. This valve is opened while filling the casing but is closed and remains closed after the casing has been filled.

It will be observed that the needle valves in the union for controlling admission to the expansion tube and its chamber are so arranged that they are capable of being operated to prevent excessive pressure on the introduction of fluids to the expansion tube and chamber, but they might not be opened in proper sequence to prevent this excessive pressure. It is therefore desirable to have an automatic valve arrangement for the expansion tube in order to prevent any possibility of excess pressure on said tube from any erroneous operation of said valves. To this end the movable end of the expansion tube is provided with a valve seat 135 (Figs. 5 and 6) coöperating with which is a valve 137 carried by an arm 139 conveniently of wire and secured to the edge of said tube end as at 141. To permit more or less lateral movement of the valve so that it may readily find its seat, the arm 139 may be provided with a U-shaped bend 143. To cause the arm to tend to press the valve on its seat it may be of resilient material or may be provided with a coil spring portion 145.

To lift the valve automatically from its seat when the tube 9 contracts beyond a predetermined limit, a stop 147 is provided, herein in the form of an offset bend of a wire 149 secured to a post 151 connected to the casing base plate 11.

When the expansion tube contracts beyond a predetermined limit the valve arm 139 will engage the stop 147 and be automatically lifted from its seat, thereby permitting the entrance of fluid from the casing into said tube, thus automatically equalizing the pressures and preventing further contraction of the tube.

To automatically open the valve on the expansion of the tube to a predetermined limit a stop 153 is provided, conveniently a continuation of the wire arm 149 forming the stop 147 referred to, and the valve carrying arm 139 is extended beyond the edge of the expansion tube and to present a reverse bend or heel 155.

When the tube expands to a predetermined limit the heel 155 will engage the stop 153, and owing to the fact that the heel is beyond the point of connection of the arm with the tube, the arm will be rocked in such a manner as to lift the valve from its seat, thereby permitting the excessive pressure within the tube to escape within the chamber and automatically equalize the pressures and prevent further expansion of the tube.

The automatic valve 137 has a further use. In filling the expansion tube with oil the valve 137 will be automatically lifted from its seat and permit the escape of air from the tube.

By my invention is provided a gage in which the pressure responsive mechanism can be relied upon to accurately respond to the pressures, there can be no liability of its being expanded or contracted sufficiently to strain or unduly distort the same because of the automatic valve mechanism directly coöperating with the expansion tube and the automatic expansion tube pressure equalizing device. The parts of the responsive mechanism are protected from corrosion or other deleterious effect from the pressure fluids by the provision for the filling of the expansion tube and the chamber containing the same with oil. The flexible connection betwen the shafts reduces their friction on their bearings to a minimum and enables the use of a long shaft and bearing which will be effective for resisting leakage from the expansion tube containing chamber. The oil in the casing 17 surrounding the shaft 35 and its bearing continuously maintains said shaft properly oiled, which further insures ease of rotation. The shaft arrangement as a whole is such that the turning thereof with the greatest possible ease is assured. Hence the shaft may be relied upon to transmit faithfully the movements of the expansion tube to the index.

Having described one illustrative embodiment of the invention, without limiting the same thereto, what I claim as new and desire to secure by Letters Patent is:

Claims:

1. In an instrument of the class described, the combination of an index, an actuating shaft therefor, responsive means, a shaft movable thereby, said shafts being substantially alined and a coupling for said shafts having arms secured to said shafts and yieldable in the line thereof.

2. In an instrument of the class described, the combination of an index, an actuating shaft therefor, responsive means, a shaft movable thereby, said shafts being substantially alined and a coupling for said shafts comprising a spring member transverse to said shafts and having arms secured thereto respectively.

3. In an instrument of the class described, the combination of an index, an actuating shaft therefor, an end thrust bearing for said shaft, responsive means, a shaft movable thereby and substantially alined with said first shaft, and connecting means between said shafts including yieldable means for pressing one axially toward the other.

4. In an instrument of the class described, the combination of an index, an actuating shaft therefor, an end thrust bearing for said shaft, responsive means, a shaft movable thereby and substantially alined with said first shaft, and yieldable means for pressing it axially toward the same comprising a spring member having arms secured to the respective shafts.

5. In an instrument of the class described, the combination of index means; responsive means to govern movement of said index means; and means connecting said index and responsive means including shafts, one having an end set in a recess in the other, and flexible means for transmitting the rotation of one to the other.

6. In an instrument of the class described, the combination of index means; a casing, responsive means therein to govern movement of said index means; and means for transmitting said movement from said responsive to said index means including a shaft projecting through said casing, a bearing for said shaft, and means for maintaining equal pressures in said bearing at the opposite ends of said shaft independently of differences in pressure within and without said casing.

7. In an instrument of the class described, the combination of index means; responsive means to govern movement of said index means; and means for transmitting said movement from said responsive to said index means including a shaft, a bearing for said shaft, and means providing an equal pressure on the opposite ends of said bearing including a duct communicating with one end of said bearing.

8. In an instrument of the class described, the combination of index means; responsive means to govern said index means; and means to transmit movement from said responsive to said index means including a shaft, a bearing for said shaft, and means for maintaining equal pressures at the opposite ends of said bearing irrespective of the pressure on said responsive means.

9. In an instrument of the class described, measuring means responsive to differential pressures, means forming passages for admitting the pressure fluid to the measuring means and bypass means between said passages, each including an expansion member in communication with one passage and opening to the other and means in said other passage coöperating with said member to provide a valve and valve-seat.

10. In an instrument of the class described, pressure measuring means, pressure conduits leading thereto and means sensitive to the pressures in the conduits reciprocally to bypass pressure fluid from one conduit to the other on the occurrence and during the continuance of a determined pressure difference.

11. In an instrument of the class described, the combination of index means; responsive means to govern movement of said index means; and means including expansion tube valves for automatically limiting the difference of the pressures acting on said responsive means.

12. In an instrument of the class described, the combination of index means; responsive means to govern movement of said index means; a chamber for receiving said responsive means; and means including expansion tube valve means having provision for automatically limiting the difference of the pressures acting in said responsive means and chamber.

13. In an instrument of the class described, the combination of index means; responsive means to govern movement of said index means; and means for automatically limiting the difference of the pressures within and without said responsive means including normally closed expansion tube means and valve means for automatically permitting the passage of fluid therethrough.

14. In an instrument of the class described, the combination of index means; responsive means to govern movement of said index means; duct means for admitting pressures to said responsive means; and means for limiting the difference of the pressures including chambers communicating with said duct means and expansion tube valve means for controlling the admission of pressure from one of said chambers to another.

15. In an instrument of the class described, the combination of index means; responsive means to govern movement of said index means; a casing receiving said responsive means; and means automatically to limit the difference of the pressures in said responsive means and casing including chambers communicating with said responsive means and casing respectively, expansion tubes in said chambers, and valve means coöperating with said tubes.

16. In an instrument of the class described, the combination of index means; responsive means to govern movement of said index means; a casing for said responsive means; pressure conducting chambers communicating with said responsive means and casing respectively; and means for automatically limiting the difference of the pressures between said chambers including pressure responsive expansion tubes in said chambers, a passage leading from the tube in one chamber to the opposite chamber, a passage leading from the tube in the latter chamber to the opposite chamber, and valve means for said tubes.

17. In an instrument of the class described, the combination of index means; responsive means to govern movement of said index means; a casing for said responsive means; pipes for conducting fluids to said responsive means and casing respectively; valve means for said pipes; chambers communicating with said pipes for supplying liquid to said pressure responsive means and casing; and automatically operating expansion tube means for equalizing the levels of the liquid in said chambers.

18. In an instrument of the class described, the combination of index means; responsive means to govern movement of said index means; a casing for said responsive means; means for preventing excessive pressure on said responsive means including a valve therefor and means for automatically opening said valve respectively on movements of said responsive means to predetermined limits; tubes for conducting fluids to said responsive means and casing; valve means for controlling the passage of said fluids through said tubes; chambers interposed in said tubes respectively for supplying liquid to said responsive means and casing; and automatic expansion tube valve means for equalizing the liquid levels in said chambers.

19. In an instrument of the class described, the combination of index means; a hollow diaphragm expansion tube to govern movement of said index means; and means for preventing excessive pressure on said tube including a valve thereon and means for automatically opening said valve on movements of said tube to predetermined limits.

20. In an instrument of the class described, the combination of index means; a hollow diaphragm expansion tube to govern movement of said index means; valve means on said tube; resilient means tending to close said valve means; and means for automatically opening said valve means on movements of said responsive means to predetermined limits.

21. In an instrument of the class described, the combination of index means; a hollow pressure responsive expansion tube for governing said index means; a valve on said tube; an arm connected to said valve and having provision tending to close the latter; and stops for engagement with said arm automatically to open said valve on expansion and contraction of said tube to predetermined limits.

22. In an instrument of the class described, the combination of index means; a hollow pressure responsive expansion tube for governing said index means; and means to prevent excessive pressures on said tube including a valve for said tube, means connecting said valve to said tube, and stop means for engaging said connecting means and automatically opening said valve on expansion or contraction of said tube to predetermined limits.

23. In an instrument of the class described, the combination of index means; responsive means for governing movement of said index means; a chamber for said responsive means; means to introduce pressures to said responsive means and chamber; and means automatically to equalize excessive pressures on said responsive means and in said chamber including a valve for said responsive means and means for automatically opening the same on movements of said responsive means to predetermined limits.

24. In an instrument of the class described, the combination of index means; a responsive tube to govern movement of said index means; a casing for said tube; receivers for supplying liquid to said tube and casing; and means including expansion tube means for automatically maintaining the same liquid levels in said receivers on the expansion and contraction of said index governing tube.

25. In an instrument of the class described, the combination of index means; a responsive tube for governing movement of said index means; a casing for said tube; receivers for supplying liquid to said tube and casing; and means including a submerged expansion tube in one of said receivers for automatically maintaining the same liquid levels in said receivers on the expansion and contraction of said index governing means.

26. In an instrument of the class described, the combination of index means; a responsive tube to govern movement of said index means; a casing containing said tube; receivers for supplying liquid to said tube and casing; and means including submerged and controlling expansion tubes for automatically maintaining the same liquid levels in said receivers.

27. In an instrument of the class described, the combination of index means; a responsive tube to govern movement of said index means; a casing for said tube; receivers for supplying liquid to said tube and casing; and means including a submerged tube in one of said receivers and a controlling tube for the latter for maintaining the same liquid levels in said receivers.

28. In an instrument of the class described, the combination of index means; a responsive tube to govern movement of said index means; a casing for said tube; receivers for supplying liquid to said tube and casing; an expansion tube submerged beneath the liquid in one of said receivers; a controlling expansion tube connected to said submerged tube; and means providing communication between said submerged and controlling tubes and the other receiver to control the liquid levels in said receivers.

29. In an instrument of the class described, the combination of index means; a responsive tube to govern movement of said index means; a casing for said tube; receivers for supplying liquid to said tube and casing; and means for controlling the liquid levels in said receivers including an expansion tube submerged in one of said receivers and a controlling tube therefor more responsive to pressure than said submerged tube.

30. In an instrument of the class described, the combination of index means; a responsive tube to govern movement of said index means; a casing for said tube; receivers for supplying liquid to said tube and casing; and means for controlling the liquid levels in said receivers including submerged means having provision for providing varying displacement thereof.

31. In an instrument of the class described, the combination of index means; a responsive tube to govern movement of said index means; a casing for said tube; receivers for supplying liquid to said tube and casing; and means including submerged means and controlling means for the latter for maintaining the same liquid levels in said receivers on the expansion and contraction of said index governing tube.

32. In a device of the class described, the combination with pressure measuring means, of a pressure equalizing device comprising, in combination, high and low pressure ducts leading to said measuring means; high and low pressure containing chambers communicating therewith; and means for automatically tending to equalize the pressures in said chambers on the attaining of a predetermined pressure difference in said ducts.

33. In a device of the class described, the combination with pressure measuring means of pressure receiving ducts leading to said measuring means; high and low pressure chambers; means providing communication from said ducts to said chambers; and means tending to equalize the pressures having provision immediately responsive to a pressure difference in said ducts exceeding a predetermined amount.

34. In a device of the class described, the combination of an index; responsive means for controlling the same; means for subjecting said responsive means to differential pressures; and means automatically tending to equalize said pressures immediately on their reaching a predetermined difference.

35. In an instrument of the class described, the combination of index means; hollow responsive means to govern movement of said index means; a chamber containing said responsive means; tubes leading to said responsive means and chamber; liquid receivers interposed in said tubes and having provision for supplying liquid within and without said responsive means; and means connecting said receivers whereby liquid from one chamber is automatically transferred to occupy space in the other to equalize the levels of liquid therein on changes of pressure.

36. An instrument of the class described comprising responsive means arranged for reaction to differential pressures; means to transmit pressures thereto comprising liquid columns; and means to by-pass liquid from one column to occupy space in the other on variations of pressure to equalize the heads thereof.

37. An instrument of the class described comprising index means; an expansion tube for moving the same; a casing inclosing said tube; connections comprising liquid containing chambers in communication with said tube and said casing respectively; and means to by-pass liquid from one chamber to occupy space in the other on variations of pressure to maintain balanced the hydraulic pressures of the liquid on said tube.

38. An instrument of the class described comprising responsive means arranged for reaction to differential pressures; means to transmit pressures thereto comprising liquid columns; and means rendered effective by depression of the liquid level in one column by increase of pressure thereon and acting temporarily to discharge sufficient liquid from the other column so as to occupy space in the first named column to maintain equality of the hydraulic pressures of said columns.

In testimony whereof, I have signed my name to this specification, in the presence of two subscribing witnesses.

EDGAR H. BRISTOL.

Witnesses:
   HENRY T. WILLIAMS,
   JOHN R. MOULTON.